Figure 1:
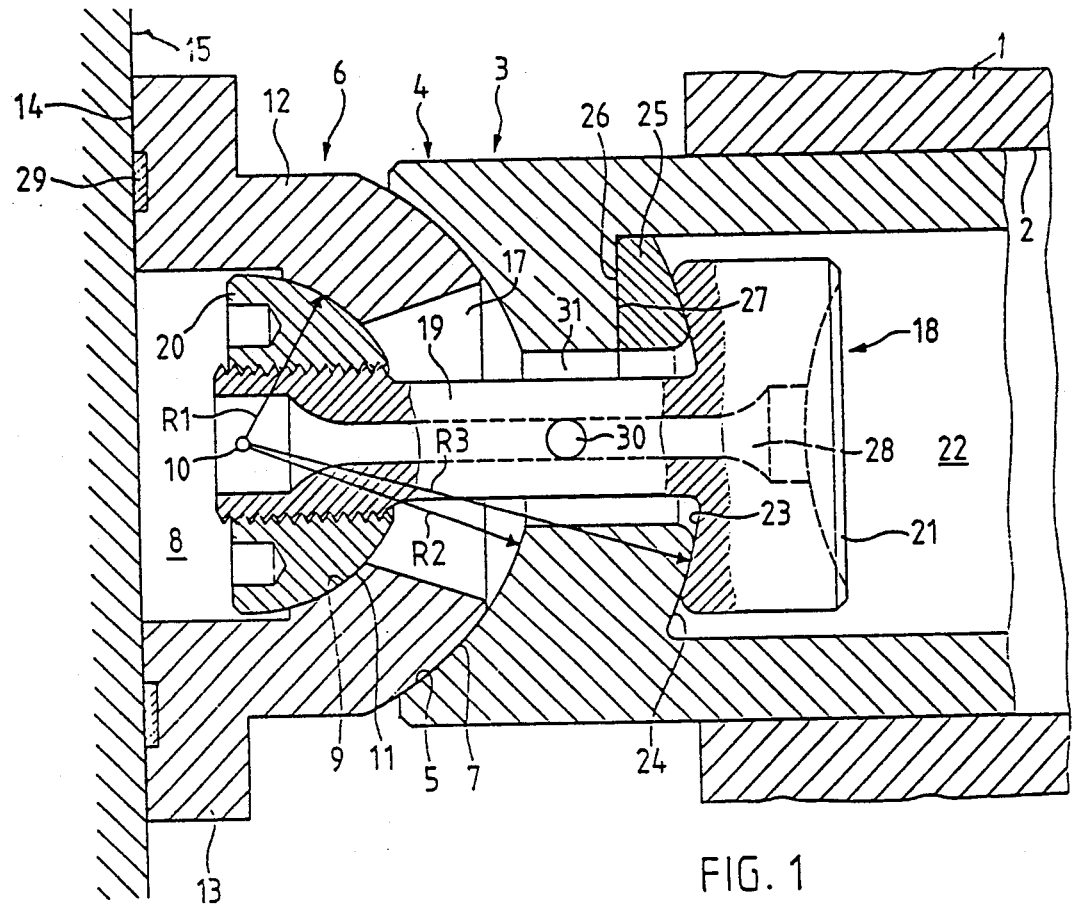

United States Patent [19]
Rébel

[11] Patent Number: 5,099,750
[45] Date of Patent: Mar. 31, 1992

[54] PISTON MECHANISM FOR A PISTON UNIT

[75] Inventor: József Rébel, Balsthal, Switzerland

[73] Assignee: Von Roll Hydraulik AG, Oesingen, Switzerland

[21] Appl. No.: 614,184

[22] Filed: Nov. 13, 1990

[51] Int. Cl.$^5$ ............................ F01B 3/00; F01B 13/00
[52] U.S. Cl. .................................... 92/12.2; 92/71; 91/199; 384/206
[58] Field of Search .................. 92/12.2, 71, 187, 216; 91/499; 384/206, 208

[56] References Cited

U.S. PATENT DOCUMENTS

| | | | |
|---|---|---|---|
| 2,483,856 | 10/1949 | Temple | 91/488 |
| 2,901,979 | 9/1959 | Henrichsen | 91/488 |
| 3,319,575 | 5/1967 | Havens | 92/260 |
| 4,454,802 | 6/1984 | Cailliau et al. | 92/158 |

FOREIGN PATENT DOCUMENTS 1357995 6/1974 United Kingdom .

Primary Examiner—Edward K. Look
Assistant Examiner—Hoang Nguyen
Attorney, Agent, or Firm—EGLI International

[57] ABSTRACT

The piston mechanism comprises a piston (3), a sliding shoe (6) and a coupling member (18) holding together the piston (3) and sliding shoe (6). The coupling member (18) comprises a shaft part (19) and joint heads (20,21) arranged at the end of the shaft part (19). The heads (20,21) have spherical zone-shaped sliding surfaces (9,11,23,24), which cooperate with corresponding sliding surfaces (9,24) in sliding shoe (6) or in the bottom of the piston (3). Due to the fact that the radius of curvature (R1,R2,R3) of the sliding surfaces of the sliding shoe (6) and the piston (3) have the same centre of curvature (10) and therefore the same fulcrum, damage to the sliding surfaces is avoided.

15 Claims, 1 Drawing Sheet

PISTON MECHANISM FOR A PISTON UNIT

The invention relates to a piston mechanism for a piston unit, particularly a hydraulic pump or hydraulic motor with at least one piston guided in a cylinder and on whose one end face acts a pressure medium and on whose other end face is provided a sliding shoe cooperating by means of a spherical joint, as well as being supported on a supporting surface by means of the sliding shoe, the piston and the sliding shoe being interconnected and held together by a coupling member provided with a longitudinal bore and having on each of its ends a joint head, which is constructed as part of a coupling spherical joint located in the interior of the piston and the sliding shoe. The field of application of such piston mechanisms is more particularly piston units used as prime movers or machines. The working medium is a pressurized gas, e.g. air, or a pressurized fluid, e.g. a hydraulic oil.

Piston mechanisms for such piston units are known in numerous different constructions. In one known construction (U.S. Pat. No. 4 454 802) the piston guided in a cylinder bore is frontally supported by means of a spherical joint on a sliding shoe. The sliding shoe is on the one hand supported on a supporting surface, the sliding shoe and the supporting surface moving relative to one another. The piston and the sliding shoe are interconnected by a coupling member, which is provided at its ends with oppositely directed spherical zone-like heads, whose spherical surfaces cooperate with concave spherical surfaces arranged in the piston and the sliding shoe, so that the piston and sliding shoe are held together. As relative movements occur between the sliding shoe and the piston and therefore in the spherical joint during the operation of such a piston unit, it is necessary that the coupling member alloys such a movement. Although in the known construction such a movement is possible, the two oppositely directed spherical zone-like heads lead to the possibility of clamping effects or play occurring in the joint faces of the coupling member, which can lead to damage to the tops of the sliding surfaces.

Another known construction of a piston mechanism (British Patent 1 357 995) has a piston-sliding shoe structure in which, unlike in the aforementioned construction, the piston is frontally provided with a convex spherical surface and the sliding shoe has a concave joint surface. The coupling member only has a spherical joint surface at one end, whereas the other end is fixed to the sliding shoe. However, it is a disadvantage of this embodiment that there is a fixed connection between the sliding shoe and the coupling member. Thus, additional stresses and/or clamping effects occur in the joint surfaces, which can lead to damage.

The invention also relates to a piston mechanism, in which the piston and the sliding shoe operate by means of a spherical joint and the piston and sliding shoe are interconnected by a coupling member.

The problem of the invention is to so further develop a piston mechanism of the aforementioned type, that relative movement between the piston and sliding shoe can take place without any clamping or play.

According to the invention this problem is solved in that the coupling spherical joints in the piston and in the sliding shoe have surfaces with radii of curvature, which are associated with spherical surfaces curved in the same direction of said spherical joints and which have the same centre of curvature. Appropriately, between the other end face of the piston and the sliding shoe, the spherical joint has a radius of curvature with the same centre of curvature as the radii of curvature of the spherical joints at the end of the coupling member. Thus, in this construction there are three radii of curvature of spherical surfaces all having the same sphere centre between the piston, the sliding shoe and the coupling member.

The invention is described in greater detail hereinafter relative to an embodiment and the attached drawings, wherein show:

FIG. 1 a longitudinal section through a piston mechanism, such as can be used for a piston unit, particularly for hydraulic pumps and motors.

Figure 2:
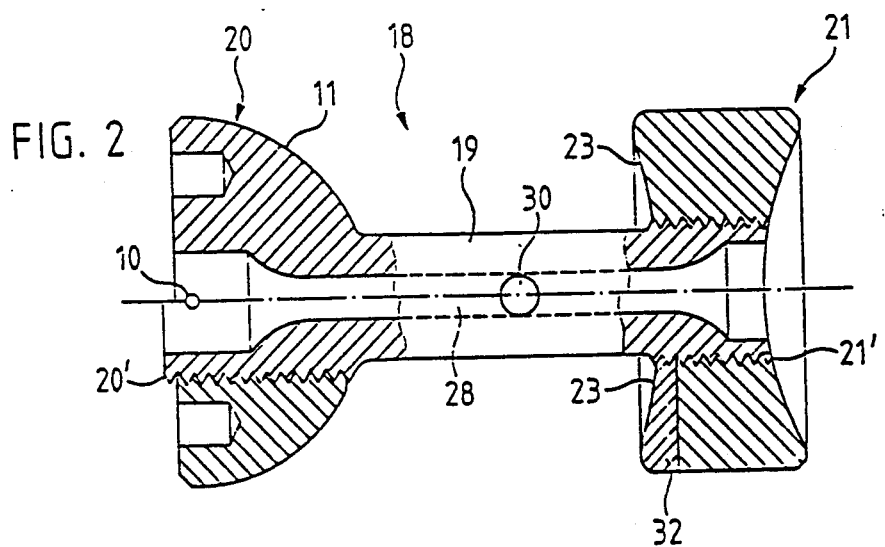

FIG. 2 a longitudinal section through a variant of the coupling member shown in FIG. 1.

In FIG. 1 is a partly shown cylinder, in which is guided in a cylinder bore 2 a piston 3. At 1, not shown end, piston 3 is subject to the action of a pressure medium, whilst the other end 4 is frontally provided with a concave, spherical zone-like sliding surface, on which is mounted a sliding shoe 6 with a convex, spherical zone-like surface 7.

Sliding shoe 6 has a cavity 8, which passes with a radius R1 in its bottom into a concave, spherical zone-like surface 9, whose sphere centre 10 is located in cavity 8. The convex, spherical zone-like surface 7 of sliding shoe 6 with a radius R2 also has the same sphere centre 10. Between these two spherical zone-like surfaces 5,7 the wall 12 of sliding shoe 6 has a hollow spherical configuration, which passes into a flange 13, whose end face 14 forms a sliding surface, which is supported on a not shown supporting surface 15. The end face 14 of sliding shoe 6 and the supporting surface 15 have a relative movement to one another, the supporting surface 15 being fixed and the end face 14 of the sliding shoe 6 rotating or conversely the supporting surface 15 rotating and the end face 14 of the sliding shoe 6 being fixed, as a function of the piston unit type. If cylinder 1 rotates, the end face 14 of sliding shoe 6 moves on the fixed supporting surface 15, as is the case with axial piston units having a rotating cylinder. However, the axial piston unit also have a fixed cylinder 1, so that in this case the supporting surface 15 rotates.

A passage 16 is provided in the wall 12 of sliding shoe 6 and through it projects a coupling member 18. Coupling member 18 comprises a shaft part 19 and two joint heads 20,21 located at its ends. Head 20 has a spherical shape with a spherical zone-like surface 11. Head 20 is fixed to the shaft part 19, e.g. by a threaded connection.

However, the coupling member 18 can also have a different construction, as shown in FIG. 2. According to the upper part of the latter the joint head 20 located in the sliding shoe 6 is integrally connected to shaft part 19 and is consequently in one piece. It is necessary in this case to construct the joint head 21 located in piston 3 as a separate part and to appropriately connect it to the shaft part 19, e.g. by a threaded connection 21'.

As can be gathered from the lower part of FIG. 2, the coupling member 18 can also be in three parts, the two joint heads 20,21 being fixed to the shaft part 19, e.g. by threaded connections 20',21'.

In the lower part of FIG. 2 the joint head 21 is also constructed in two part form, a plate 32 being arranged on the side of the joint head 21 directed against joint head 20 and said plate has the concave spherical zone 23. As the joint head 21 performs no further sliding function, it is sufficient for the plate 32 to be made from a material which has particularly favourable sliding characteristics and a high abrasion resistance, e.g. a heat treated, particularly alloyed steel, a bronze-coated steel or entirely from bronze. If the joint head 21 and also the joint head 20 are made from one piece, the same considerations as applied to the construction of plate 32 apply to the construction of the concave spherical zone 23 and the convex spherical zone-shaped sliding surface 11.

Head 21 is located in the inner area 22 of hollow piston 3 and has a cylindrical shape which, on the side 23 facing sliding shoe 6 is shaped like a concave spherical zone. The spherical zone 23 is located on a convex spherical zone 24, which is located on the bottom of the inner area 22 of piston 3. As shown in the lower part of FIG. 1, the spherical zone 24 can be constructed as an integral part of piston 3. However, according to the upper part of FIG. 1, it can also be constructed as a separate part 25 with a planar underside 26, which is placed on the in this case flat bottom 27 in the inner area 22 of piston 3. The radius of curvature R3 of the two spherical zones 23,24 appropriately has the same sphere centre 10 as the radii of curvature of the spherical zone-shaped surfaces 5,7 and 9,11.

Over its entire length the coupling member 18 is provided with a bore 28 through which the pressure medium located in the inner area 22 of piston 3 is passed into the cavity 8 and can be used from there for supplying the pressure areas 29 in end face 24. The shaft part 19 has a cross bore 30, which is connected to the longitudinal bore 28 and makes it possible to introduce the pressure medium into passage 17 in wall 12 of sliding shoe 6 and into the bore 31 provided in the bottom of piston 3. Thus, the pressure medium acts on all three sliding surfaces 5,7,9,11 and 23,25. As the radii of curvature of these three sliding surfaces have the same sphere centre 10, in the case of movements between the piston 3 and the sliding shoe 6 there are three sliding surfaces which permit a clamping-free displacement of the coupling member 18 relative to piston 3 and sliding shoe 6. This reliably avoids damage to the sliding surfaces.

The same considerations as regards the material selection as provided hereinbefore concerning the coupling member 18 apply to piston 3, sliding shoe 6, the separate part 25 and supporting surface 15. With regards to the relatively high surface pressures occurring on the different sliding surfaces, it is necessary to choose a material combination having favourable friction characteristics and abrasion resistance. It is e.g. advantageous to provide on the existing sliding surfaces a combination with bronze for one sliding surface and heat treated alloyed steel for the other sliding surface.

I claim:

1. Piston mechanism for a piston unit, including a hydraulic pump or hydraulic motor with at least one piston (3) guided in a cylinder (1) and on whose one end face (4) a pressure medium acts and on whose other end face is provided a sliding shoe cooperating by means of a spherical joint (5,7), as well as being supported on a supporting surface (15) by means of the sliding shoe (6), the piston and the sliding shoe being interconnected and held together by a coupling member (18) provided with a longitudinal bore (28) and having on each of its ends a joint head (20,21), which is constructed as part of a coupling spherical joint (9,11,23,24) located in the interior of the piston (3) and the sliding shoe (6), characterized in that the coupling spherical joints (9,11,23,24) in piston (3) and sliding shoe (6) have surfaces with radii of curvature (R1,R3), which are associated with spherical surfaces curved in the same direction of said spherical joints (9,11,23,24) and have the same centre of curvature (10).

2. Piston mechanism according to claim 1, characterized in that the surface of the spherical joint (5,7) between the other end face (4) of piston (3) and the sliding shoe (6) has a radius of curvature (R2) with the same centre of curvature (10) as the radii of curvature (R1,R3) of the coupling spherical joints (9,11,23,24) at the ends of the coupling member (18).

3. Piston mechanism according to claim 1, characterized in that the common centre (10) is located in the interior of sliding shoe (6).

4. Piston mechanism according to claim 3, characterized in that the spherical zone-shaped surface (24) of piston (3) located in the coupling spherical joint (23,24) between the bottom of piston (3) and the coupling member (18) is an integral part of the piston head.

5. Piston mechanism according to claim 3, characterized in that the convex spherical zone surface (24) of the coupling spherical joint (23,24) between piston (3) and coupling member (18) is part of a separate plate (25) located in the interior of the piston.

6. Piston mechanism according to claim 5, characterized in that the separate plate (25) is provided on the underside with a planar surface (26), which is supported on a planar surface (27) in the interior of piston (3).

7. Piston mechanism according to claim 1, characterized in that in the longitudinal bore (28) of coupling member (18) a cross bore (30) is arranged in shaft part (19) through which the pressure medium in piston (3) acts on the free area (17,31) in piston (3) and sliding shoe (6) surrounding the shaft part.

8. Piston mechanism for a piston unit, including a hydraulic pump or hydraulic motor with a piston (3) guided in a cylinder (1) and on whose one end face (4) a pressure medium acts and on whose other end face is provided a sliding shoe (6) cooperating by means of a spherical joint (5, 7), as well as being supported on a supporting surface (15) by means of the sliding shoe (6).

the piston (3) and the sliding shoe (6) being interconnected and closely held together by a coupling member (18) provided with a longitudinal bore (28) and having on each of its ends a join head (20, 21), which is constructed as part of a coupling spherical joint (9, 11, 23, 24) located in the interior of the piston (3) and the sliding shoe (6), wherein the coupling spherical joints (9, 11, 23, 24) in piston (3) and sliding she (6) have surfaces with radii of curvature (R1, R3), which are associated with spherical surfaces curved in the same direction of said spherical joints (9, 11, 23, 24) and have a common center of curvature (10), and the surface of the spherical joint (5, 7) between the other end face (4) of piston (3) and the sliding shoe (6) has a radius of curvature (R2) with the same center of curvature (10) as the radii of curvature (R1, R3) of the coupling spherical joints (9, 11, 23, 24) at the ends of the coupling member (18), only permitting relative movement between the piston (3) and the sliding shoe (6) about the center or curvature (10).

9. Piston mechanism according to claim 8, wherein the common center of curvature (10) is located in the interior of sliding shoe (6).

10. Piston mechanism according to claim 9, wherein the spherical zone-shaped surface (24) of piston (3)

located in the coupling spherical joint (23, 24) between the bottom of piston (3) and the coupling member (18) is an integral part of the piston head.

11. Piston mechanism according to claim 9, wherein the convex spherical zone surface (24) of the coupling spherical joint (23,24) between piston (3) and coupling member (18) is part of a separate plate (25) located in the interior of the piston.

12. Piston mechanism according to claim 11, wherein the separate plate (25) is provided on the underside with a planar surface (26), which is supported on a planar surface (27) in the interior of piston (3).

13. Piston mechanism according to claim 8, wherein in the longitudinal bore (28) of coupling member (18) a cross bore (30) is arranged in shaft part (19) through which the pressure medium is piston (3) acts on the free area (17,31) in piston (3) and sliding shoe (6) surrounding the shaft part.

14. Piston mechanism for a piston unit, including a hydraulic pump or hydraulic motor comprising:
a piston (3) guided in a cylinder (1) having an end wall (4) with a concave spherical surface (5), having an inner cylindrical cavity (22) which is partly defined by an inner convex spherical surface (24), the end wall having a bore (31) through it;
a sliding shoe (6) having a spherical wall (12) enclosing an inner cavity (8) which is partly defined by an inner concave spherical surface (9), the wall (12) a convex spherical surfaces (7) for slidably cooperating within the concave spherical surface (5) of the piston, (3), the wall (12) having a passage (17) through it, the sliding shoe (6) being supported on a supporting surface (15);
a coupling member (18) having a shaft (19) for passing through bore (31) of the piston (3) and passage (17) of the sliding shoe (6) and having a first and second joint head (20, 21) fixedly adapted on each end to interconnect and firmly hold together the piston (3) and the sliding shoe (6), the first joint head (20) being disposed within the inner cavity (8) of the sliding shoe (6) and having a convex spherical surface (11) for slidably cooperating within the inner concave spherical surface (9) of the sliding shoe (6), the second joint head (21) being disposed within the inner cylindrical cavity (22) of the piston (3) and having a concave spherical surface (23) for slidably cooperating within the inner convex spherical surface (24) of the piston (3),
all of the spherical surfaces (5, 7, 9, 11, 23, 24) having a respective radii of curvature (R1, R2, R3) measured from a common center of curvature (10) located in the inner cavity (8) of sliding shoe (6), only permitting relative movement between the piston (3) and the sliding shoe (6) about the common center of curvature (10).

15. Piston mechanism according to claim 14, wherein the shaft part (19) has a longitudinal bore (28) with a cross bore (30) arranged therein through which a pressure medium flows as a lubricant within bore (31) of the piston (3) and passage (17) of the sliding shoe (6) surrounding the shaft part (19).

* * * * *